(12) United States Patent
Von Novak, III et al.

(10) Patent No.: US 10,333,352 B2
(45) Date of Patent: Jun. 25, 2019

(54) WIRELESS POWER TRANSFER CONTROL

(71) Applicant: QUALCOMM Incorporated, San Diego, CA (US)

(72) Inventors: William Henry Von Novak, III, San Diego, CA (US); Linda Stacey Irish, San Diego, CA (US); Cody Burton Wheeland, San Diego, CA (US); Seong Heon Jeong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 15/241,394

(22) Filed: Aug. 19, 2016

(65) Prior Publication Data

US 2018/0054090 A1 Feb. 22, 2018

(51) Int. Cl.
*H02J 50/12* (2016.01)
*H02J 50/80* (2016.01)
*H02J 7/02* (2016.01)

(52) U.S. Cl.
CPC .............. *H02J 50/12* (2016.02); *H02J 7/025* (2013.01); *H02J 50/80* (2016.02)

(58) Field of Classification Search
CPC ................................. H02J 50/12; H02J 50/80
See application file for complete search history.

(56) References Cited

U.S. PATENT DOCUMENTS

| 6,442,434 B1* | 8/2002 | Zarinetchi ............ A61N 1/3787 607/61 |
| 2010/0244767 A1* | 9/2010 | Turner .................... H02J 7/025 320/108 |
| 2012/0155344 A1 | 6/2012 | Wiley et al. |
| 2013/0099591 A1* | 4/2013 | Yeo ...................... H02M 3/3376 307/104 |
| 2014/0217831 A1 | 8/2014 | Hyoung et al. |
| 2015/0349538 A1 | 12/2015 | Agostinelli et al. |
| 2016/0008602 A1 | 1/2016 | Perryman et al. |

FOREIGN PATENT DOCUMENTS

| EP | 0476730 A1 | 3/1992 |
| WO | WO-2010012035 A1 | 2/2010 |
| WO | 2015071902 A1 | 5/2015 |

OTHER PUBLICATIONS

Amos, S. W., R. S. Amos, and G. W. A. Dummer. "Newnes Dictionary of Electronics 4, 1999." Reed Educational and Proffessional Publishing Ltd.: pp. 227, 229. (Year: 1999).*
International Search Report and Written Opinion—PCT/US2017/046977—ISA/EPO—dated Sep. 28, 2017.

* cited by examiner

*Primary Examiner* — Daniel J Cavallari
(74) *Attorney, Agent, or Firm* — Patterson & Sheridan, LLP (57) ABSTRACT

Certain aspects of the present disclosure relate to methods and apparatus for controlling a power level of wireless power transfer. Certain aspects provide a wireless power receiver. The wireless power receiver includes an antenna and a rectifier. The rectifier includes a first diode and a second diode. The wireless power receiver further includes a resistor in parallel with the first diode. A first terminal of the resistor is coupled to a first terminal of the first diode. A second terminal of the resistor is coupled to a second terminal of the first diode.

12 Claims, 6 Drawing Sheets

WIRELESS POWER TRANSFER CONTROL

TECHNICAL FIELD

The present disclosure relates generally to wireless power transfer, and in particular to controlling a power level of wireless power transfer.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, medical implants, and the like. While battery technology has improved, battery-powered electronic devices increasingly require and consume greater amounts of power. As such, these devices constantly require recharging. Rechargeable devices are often charged via wired connections that require cables or other similar connectors that are physically connected to a power supply. Cables and similar connectors may sometimes be inconvenient or cumbersome and have other drawbacks. Wireless power transfer systems, for example, may allow users to charge and/or power electronic devices without physical, electrical connections, thus reducing the number of components required for operation of the electronic devices and simplifying the use of the electronic device.

For example, some battery powered devices, such as medical implants (e.g., pacemakers, neuromodulation devices, insulin pumps, etc.) may be located/positioned in areas where replacing the battery is not always feasible (e.g., in a body, such as, a human body). For example, to change a battery for a medical implant, surgery may need to be performed, which is risky. Accordingly, it may be safer to charge such devices wirelessly.

Further, some electronic devices may not be battery powered, but it still may be beneficial to utilize wireless power transfer to power such devices. In particular, the use of wireless power may eliminate the need for cords/cables to be attached to the electronic devices, which may be inconvenient and aesthetically displeasing.

Different electronic devices may have different shapes, sizes, and power requirements. There is flexibility in having different sizes and shapes in the components (e.g., magnetic coil, charging plate, etc.) that make up a wireless power transmitter and/or a wireless power receiver in terms of industrial design and support for a wide range of devices

SUMMARY

Certain aspects of the present disclosure provide a wireless power receiver. The wireless power receiver includes an antenna and a rectifier. The rectifier includes a first diode and a second diode. The wireless power receiver further includes a resistor in parallel with the first diode. A first terminal of the resistor is coupled to a first terminal of the first diode. A second terminal of the resistor is coupled to a second terminal of the first diode.

Certain aspects of the present disclosure provide a wireless power transmitter including one or more antennas configured generate a wireless field for wireless power transfer and receive a signal based on the generated wireless field. The wireless power transmitter further includes a first filter configured to select second harmonics of the signal. The wireless power transmitter further includes a second filter configured to select third harmonics of the signal. The wireless power transmitter further includes a first detector coupled to the first filter. The wireless power transmitter further includes a second detector coupled to the second filter.

Certain aspects of the present disclosure provide a wireless power receiver. The wireless power receiver includes an antenna and a rectifier. The rectifier includes a first diode and a second diode. The wireless power receiver further includes a capacitor coupled in parallel with the antenna. A configuration of the capacitor is configured to selectively generate harmonics at the wireless power receiver.

Certain aspects of the present disclosure provide a method for controlling a wireless power transmitter. The method includes generating a wireless field for wireless power transfer at a power level. The method further includes detecting levels of second harmonics and third harmonics of the generated wireless field. The method further includes incrementally increasing the power level of the wireless field based on detecting levels of second harmonics above a first threshold. The method further includes holding the power level of the wireless field based on detecting levels of second harmonics above the first threshold and levels of third harmonics above a second threshold.

Certain aspects of the present disclosure provide a wireless power receiver. The wireless power receiver includes an antenna comprising a coil electrically coupled to a capacitor. The antenna is configured to inductively couple power from a wireless field that induces an alternating current signal in the antenna. The wireless power receiver further includes an active rectifier configured to produce a direct current signal to apply to a load based on the alternating current signal. Rectification of the active rectifier is controlled to selectively modulate harmonics at different power levels.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

Drawing elements that are common among the following figures may be identified using the same reference numerals.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

Figure 1:
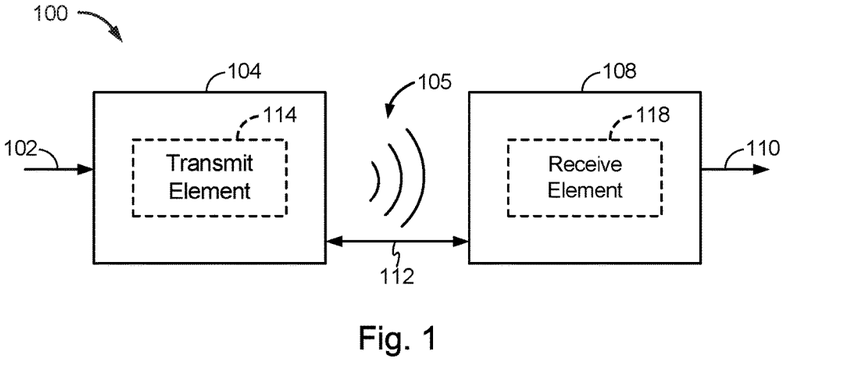
FIG. 1 is a functional block diagram of a wireless power transfer system in accordance with an illustrative aspect.

FIG. 1 is a functional block diagram of a wireless power transfer system 100, in accordance with an illustrative aspect. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative aspect, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain aspects, the wireless field 105 may correspond to the "near field" of the transmitter 104. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114. Conversely, the far field may correspond to a region that is greater than about one wavelength of the power transmitting element 114.

In certain aspects, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
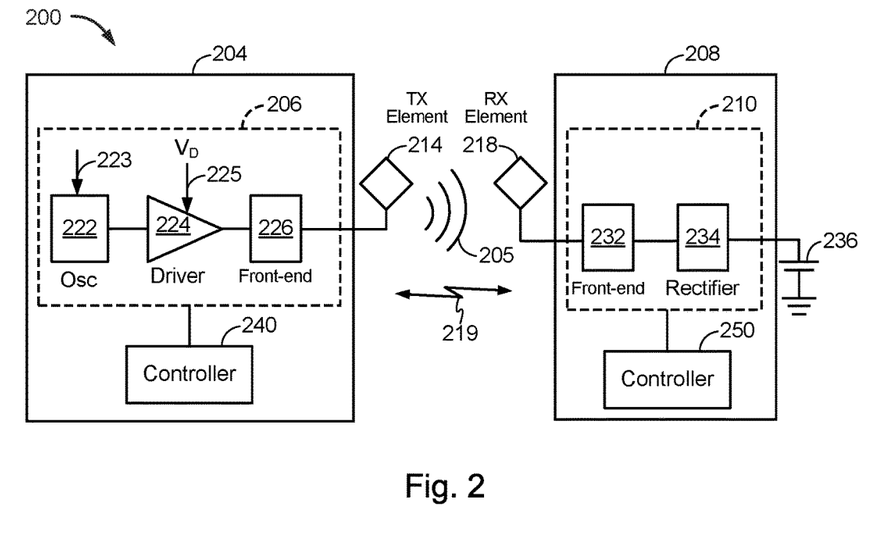
FIG. 2 is a functional block diagram of a wireless power transfer system in accordance with an illustrative aspect.

FIG. 2 is a functional block diagram of a wireless power transfer system 200, in accordance with another illustrative aspect. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate an oscillator signal (also known as an oscillating signal) at a desired frequency (e.g., fundamental frequency) that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output as a driving signal output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain aspects, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
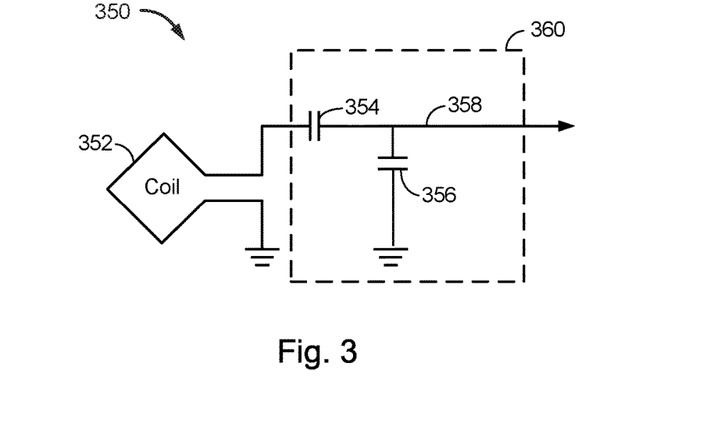
FIG. 3 is a schematic diagram of a portion of transmit circuitry or receive circuitry of FIG. 2 including a power transmitting or receiving element in accordance with an illustrative aspect.

FIG. 3 is a schematic diagram of a portion of the transmit circuitry 206 or the receive circuitry 210 of FIG. 2, in accordance with illustrative aspects. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another antenna. The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356, which may be added to the transmit and/or receive circuitry 350 to create a resonant circuit.

The tuning circuit 360 may include other components to form a resonant circuit with the power transmitting or receiving element 352. As another non limiting example, the tuning circuit 360 may include a capacitor (not shown) placed in parallel between the two terminals of the circuitry 350. Still other designs are possible. In some aspects, the tuning circuit in the front-end circuit 226 may have the same design (e.g., 360) as the tuning circuit in front-end circuit 232. In other aspects, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

In some aspects, when power (e.g., energy) is wirelessly received by a device (e.g., medical implant) with a wireless power receiver (e.g., receiver 208) from a wireless power transmitter (e.g., transmitter 204), there may be a method of power control to ensure that the correct amount of power is transferred from the transmitter 204 to the receiver 208. For example, the device with the receiver 208 may be configured to operate/charge at a particular voltage (e.g., 4.2 V). However, generating a fixed strength wireless field 205 by the transmitter 204 may not produce the desired voltage at the receiver 208. For example, the amount of power transferred between the transmitter 204 and the receiver 208 at any given strength of the wireless field 205 may differ based on the distance between (and/or other factors such as materials between, etc.) the transmitter 204 and the receiver 208. Accordingly, the power (e.g., voltage) generated by the receiver 208 for the device may be variable based on one or more factors for the same strength of wireless field 205 from the transmitter 204. For example, a medical implant device may be implanted in a person at various distances/positions under the skin and with varying tissue types and thicknesses. Accordingly, certain aspects discussed herein relate to systems and methods for controlling the power transferred from a wireless power transmitter to a wireless power receiver to ensure that the device with the wireless power receiver receives the correct power supply.

In some aspects, a closed-loop power control scheme may be employed to adjust the strength of the wireless field 205 to ensure that the power (e.g., voltage) at the device being wirelessly powered is the desired power (e.g., desired voltage). For example, in some aspects, the wireless receiver 208 may be configured to actively determine a power level of the power received at the receiver 208, such as, a voltage at the rectifier 234. For example, the controller 250 may be configured to monitor the voltage at the rectifier 234. Depending on whether the voltage at the rectifier 234 is above or below a range of the desired voltage level, the wireless receiver 208 (e.g., as controlled by the controller 250) may transmit feedback information (e.g., as a control signal) (e.g., via communication channel 219 or in-band signaling using the wireless field 205) to the wireless transmitter 204 indicating whether a strength of the wireless field 205 should be increased or decreased. No control signal may be sent if the voltage at the rectifier 234 is within the range of the desired voltage level. The wireless transmitter 204 may receive the control signal and adjust the strength of the wireless field 205 (e.g., by control from the controller 240), accordingly.

In some aspects, the power levels at the receiver 208 may be very low, and therefore higher power techniques for transmitting feedback information (e.g., higher power communication via communication channel 219 or in-band signaling) may not be feasible. In particular, the device with the receiver 208 may not be able to actively transmit feedback information to the transmitter 204, so the transmitter 204 does not have information about the voltage at the device being charged and cannot adjust the strength of the wireless field 205 to ensure the device is operating at the correct voltage using current techniques. For example, if a battery at the device is fully discharged, there may be a delay in time (e.g., 10 s) between when power is initially received by the wireless receiver 208 at the device from the wireless power transmitter 204 and when the device boots up and is able to use the communication channel 219 (e.g., via a radio) or in-band signaling (e.g., as controlled by the controller 250, which requires power), to transmit the feedback information to the transmitter 204. In some cases, the device may not have means (e.g., a radio) to transmit the feedback information.

Accordingly, certain aspects of the present disclosure are directed to feedback mechanisms for wireless power transfer in order to control a power level of the wireless power transmitter. In particular, as discussed, receiver 208 includes a rectifier 234 to generate a DC power output from an AC power input. Certain aspects of the present disclosure are directed to a rectifier designed to provide feedback information about the voltage level at the receiver 208. In particular, certain aspects are directed to a receiver 208 configured to generate harmonics during rectification and use such harmonics to communicate with the transmitter 204. For example, the receiver 208 may generate certain harmonics that indicate there is enough power at the receiver 208, or even any other information (e.g., other status information of the receiver 208). In certain aspects, the transmitter 204 may detect such harmonics (e.g., via an antenna, such as, transmitting element 214). In certain aspects, the detection of harmonics may indicate to the transmitter 204 that a device (e.g., receiver 208) configured and able to receive wireless power is present and absorbing wireless power. In certain aspects, the detection of harmonics may indicate other information as discussed.

Figure 4:
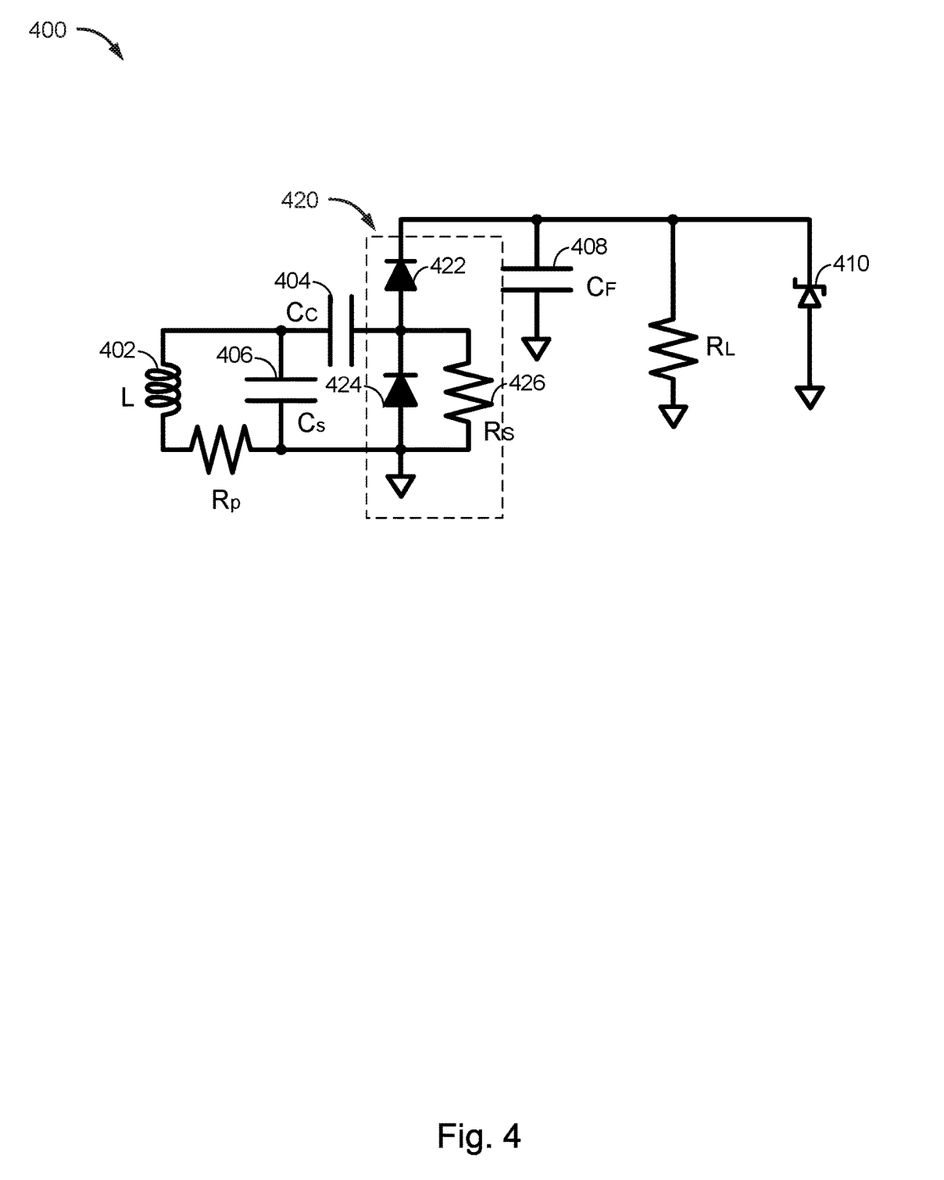
FIG. 4 is a schematic diagram of a portion of receive circuitry including a rectifier according to certain aspects of this disclosure.

FIG. 4 is a schematic diagram of a portion of receive circuitry 400 including a rectifier according to certain aspects of this disclosure. The receive circuitry 400 may correspond to a portion of the receiver 208. As shown the receive circuitry 400 includes a receive antenna (e.g., inductor, coil, receiving element 352, etc.) 402. Further, the receive circuitry 400 includes a coupling capacitor ($C_C$) 404, and a shunt resonant capacitor ($C_S$) 406 (e.g., 300 pF). $C_C$ 404 may be a large-value (e.g., 260 pF) capacitor and configured to couple AC power to the rectifier 420. The capacitors 404 and 406 may be provided to create a resonant structure at a desired resonant frequency.

The receive circuitry 400 further includes a filter capacitor ($C_f$) 408 (e.g., 0.01 μF), which may be configured to filter/smooth the power transferred. Further, the equivalent resistance $R_L$ (e.g., 1 kΩ) of the load (e.g., battery, implant device, etc.) powered by the receive circuitry 400 is shown. In certain aspects, the receive circuitry 400 includes an optional diode 410 (e.g., Zener diode) that is configured to act as a voltage clamp. Further, the parasitic resistance $R_P$ (e.g., 1Ω) of the capacitors and antenna is shown.

The rectifier 420 comprises a first diode 422 and a second diode 424 coupled in series. Further, the rectifier 420 includes a resistor ($R_S$) 426 (e.g., a high value resistor, such as, 100 kΩ) coupled in parallel to the second diode 424, with a first terminal of the $R_S$ 426 being coupled to a first terminal of the second diode 424, and a second terminal of the $R_S$ 426 being coupled to a second terminal of the second diode 424. In certain aspects, the first diode 422 and second diode 424 are configured to act as or part of a voltage doubler rectifier.

Properties of rectifier 420, may be used as feedback information about the voltage level at the receive circuitry 400 (e.g., the voltage at the load connected to the receive circuitry 400). For example, as the power received by the antenna 402 from a wireless power transmitter (e.g., transmitter 204) rises, the nonlinear properties of the first diode 422 and the second diode 424 cause the first diode 422 and the second diode 424 to generate harmonics that change with voltage level. At power levels received by the antenna 402 below a first threshold (e.g., 0.5 V) neither the first diode 422 nor the second diode 424 conducts as the $R_S$ 426 keeps the voltage at a node between the first diode 422 and the second diode 424 low. Accordingly, there is substantially no voltage at the load of the receive circuitry 400.

As the power received by the antenna 402 from a wireless power transmitter (e.g., transmitter 204) rises above the first threshold, but below a second threshold (e.g., 0.5 V above the voltage on $R_L$), the second diode 424 begins to conduct. In particular, the $R_S$ 426 in parallel with the second diode 424 causes the second diode 424 to conduct at power levels lower than the first diode 422. As the second diode 424 conducts, second harmonics of the received power signal (e.g., received at a particular fundamental frequency) are generated by the second diode 424 and radiated back through the antenna 402. It should be noted that such generation of second harmonics is based on the properties of the second diode 424 and not separately generated by active circuitry. Such second harmonics radiated back from the antenna 402 may be detectable by the wireless power transmitter (e.g., transmitter 204) as discussed further herein. At power levels where only the second diode 424 conducts, the voltage level at the load of the receive circuitry 400 may be below the desired voltage level.

Further, as the power received by the antenna 402 from a wireless power transmitter (e.g., transmitter 204) rises above the second threshold, the first diode 422 begins to conduct in addition to the second diode 424. In particular, at these higher power levels, the influence of the $R_S$ 426 on the circuit becomes minimal as the voltage at the node between the first diode and the second diode 424 is set by the clamping action of the first diode 422 and the second diode 424. The first diode 422 and second diode 424 generate third harmonics of the received power signal. The third harmonics are radiated back through the antenna 402. It should be noted that such generation of third harmonics is based on the properties of the first diode 422 and the second diode 424 and not separately generated by active circuitry. Such third harmonics may be detectable by the wireless power transmitter (e.g., transmitter 204) as discussed further herein. At power levels where the first diode 422 and the second diode 424 conduct, the voltage level at the load of the receive circuitry 400 may be at or near the desired voltage level.

A wireless power transmitter, e.g., transmitter 204, may be configured to detect the second and third harmonics radiated (e.g., reflected) from the antenna 402, and based on those signals control the power of the charging field emitted by the wireless power transmitter. In certain aspects, the wireless power transmitter may utilize the level of each of or a ratio of the second and third harmonics to control the power of the charging field.

In certain aspects, the transmitter 204 may be configured to generate a clean (minimal second or third order harmonics) wireless field 205 to transmit to the receiver 208. For example, the front-end circuit 226 may include a filter circuit configured to filter out second and third order harmonics from the signal utilized to generate the wireless field 205. Filtering out such second and third harmonics may help to prevent such second and third harmonics from the transmitter 204 being mistaken for second and third harmonics generated by the receiver 208. As the power level of the wireless field 205 increases, and the first diode 422 and/or the second diode 424 begin conducting, the transmitter 204 may receive the radiated harmonics from the receiver 208. The transmitter 204 may utilize the same power transmitting element 214 as used to generate the wireless field 205 to receive the radiated harmonics, or may use a different element (e.g., antenna, coil, etc.). The radiated harmonics may be received as part of a wireless field generated by the receiver 208, which may contain other signals, such as the wireless field 205. The transmitter 204 may control the power of the wireless field 205 emitted by the wireless power transmitter 204 based on the received harmonics as discussed herein.

Figure 5:
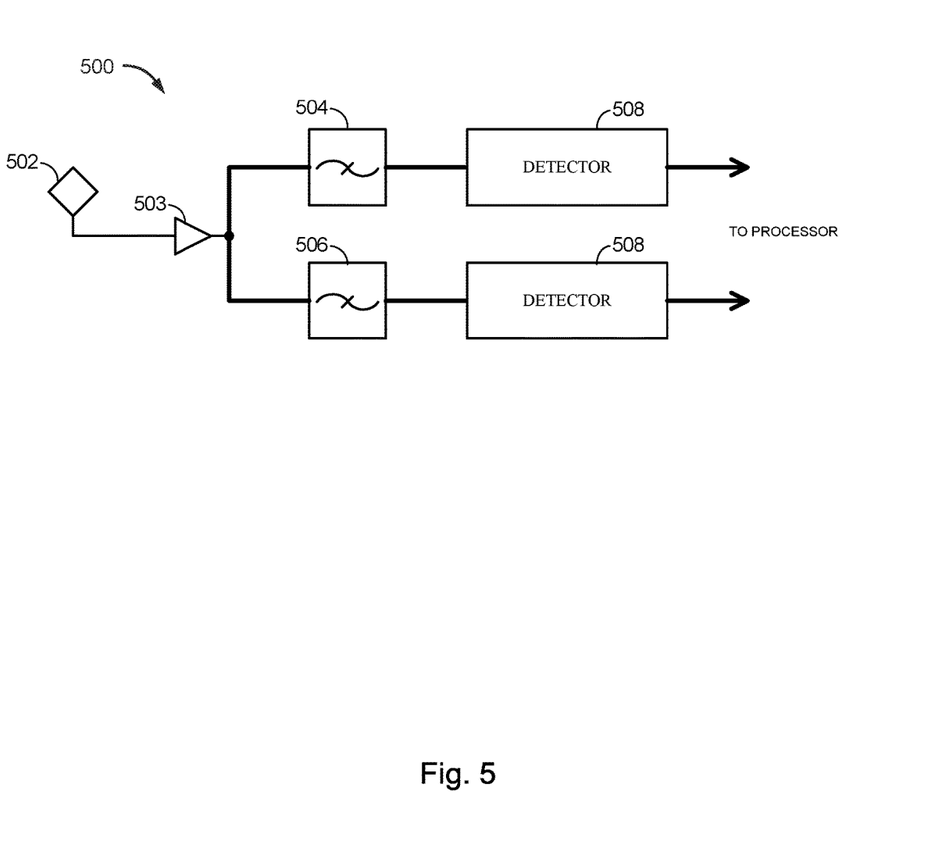
FIG. 5 is a block diagram of a portion of transmit circuitry according to certain aspects of this disclosure.

FIG. 5 is a block diagram of a portion of transmit circuitry 500 according to certain aspects of this disclosure. The transmit circuitry 500 may correspond to a portion of the transmitter 204. The transmit circuitry 500 may be utilized to receive the radiated harmonics from the receiver 208. As shown the transmitter circuitry 500 includes an antenna (e.g., power transmitting element 214, a separate antenna, coil, etc.) 502. The received signal from the antenna 502 may amplified by amplifier 503 and split and passed through two separate filters (e.g., band filters) that select for the second and third harmonics, respectively. In particular, the received signal may be passed through a first filter 504, as shown, which may comprise a band pass filter to pass frequencies in the signal corresponding to the second harmonics. In addition, the received signal may be passed through a second filter 506, as shown, which may comprise a band pass filter to pass frequencies in the signal corresponding to the third harmonics.

The output of each of the first filter 504 and the second filter 506 may then be sent to one or more signal processors (e.g., signal detectors) 508 to detect the relative strength of the second harmonics and third harmonics received. In certain aspects, separate signal processors 508 may be used to detect each of the second harmonics and third harmonics. In certain aspects, a single signal processor 508 may be configured to detect both the second harmonics and third harmonics. Indications of the strength (e.g., relative to one or more thresholds, absolute indicators, voltage output proportional to strength, etc.) may be sent from the signal processor 508 to the controller 240 (or another processor) to adjust the power of the wireless field 205. In certain aspects, the signal processor 508 and the controller 240 may be implemented on a single chip or separate chips.

The controller 240 may control the power of the wireless field 205 based on the indications of the strength of the second and third harmonics received from the receiver 208. In particular, the controller 240, in certain aspects, may be configured to incrementally increase the power of the wireless field 205 when initially powering a device (e.g., upon initial coupling between the transmitter 204 and receiver 208) until the strength of the received second harmonics is above a first threshold, and the strength of the received third harmonics is above a second threshold. The controller 240 may then hold the strength of the wireless field 205, or increase the strength of the wireless field 205 by a known quantity, until the receiver 208 is fully powered.

Figure 6:
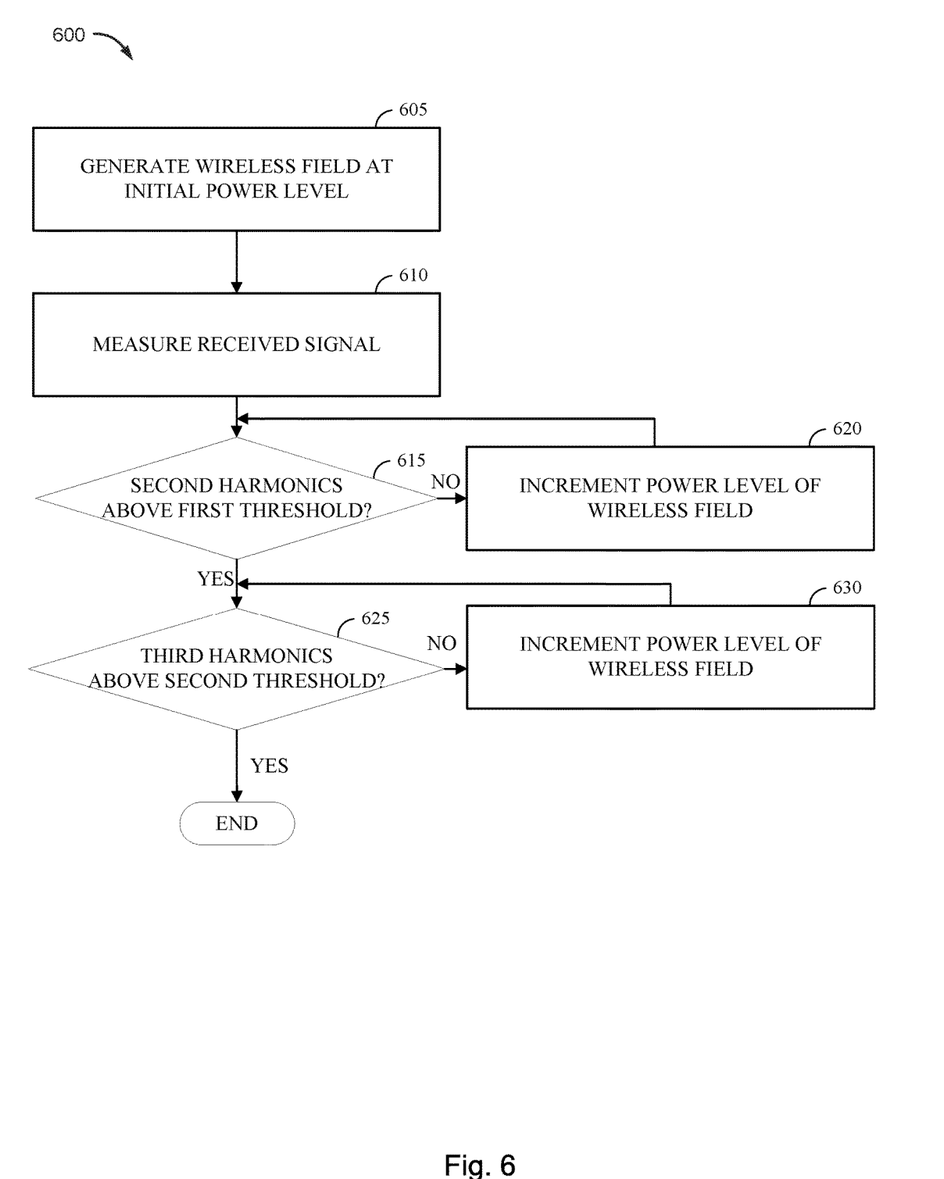
FIG. 6 is a flowchart of example operations for wireless power transfer, in accordance with certain aspects of the present disclosure.

FIG. 6 is a flowchart of example operations 600 for wireless power transfer, in accordance with certain aspects of the present disclosure.

At 605, the transmitter 204 may generate a wireless field 205 at an initial power level (e.g., lowest power level) to transfer power to the receiver 208. In certain aspects, before generating the wireless field 205, the transmitter 204 may measure harmonic levels (e.g., second and third harmonics) at harmonics of the wireless field 205 to be generated. In some aspects, thresholds for the second harmonics and third harmonics for detection of a wireless power receiver, adjustment of the power level of the wireless field 205, etc., may be adjusted based on the measured harmonic levels (e.g., use the measured harmonics levels as a baseline and look for an increase by a certain threshold). At 610, the transmitter 204 may measure a received signal, which may include radiated harmonics from the receiver 208. In certain aspects, the transmitter 204 may keep generating the wireless field 205 while measuring the radiated harmonics from the receiver 208. In certain aspects, the transmitter 204 may stop generating the wireless field 205 (e.g., by powering down the driver 224) temporarily while measuring the radiated harmonics from the receiver 208, and then return to generating the wireless field 205. At 615 the transmitter 204 determines if the second order harmonics in the received signal are above a first threshold. If the second order harmonics are not above the first threshold, at 620, the transmitter 204 increments the power level up of the wireless field 205 and returns to 615.

If the second order harmonics are above the first threshold, at 625, the transmitter 204 determines if the third order harmonics on the received signal are above a second threshold. If the third order harmonics are not above the second threshold, at 630, the transmitter 204 increments the power level up of the wireless field 205 and returns to 625.

If the third order harmonics are above the second threshold, the operations 600 may end. The transmitter 204 may hold the strength of the wireless field 205, or increase the strength of the wireless field 205 by a known quantity. In particular, once the third order harmonics are above the second threshold, the diodes of the receiver 208 are conducting and sufficient power is being received at the receiver 208 for the device with the receiver 208 to power up. Further control of the transmitter 204 and the receiver 208 may be achieved by other means and techniques for feedback.

In some aspects, the receive circuitry 400 discussed with respect to FIG. 4 may be configured to generate harmonics using passive circuitry and not require any active circuitry (e.g., switches) to generate harmonics. Accordingly, the receive circuitry 400, as discussed, may not require additional power to control such active circuitry to generate harmonics and can work at very low power levels.

In some other aspects, receive circuitry at a receiver (e.g., receiver 208) may be designed to have some active circuitry to selectively generate harmonics at the receiver 208 to communicate with the transmitter 204. The transmitter 204 may detect (e.g., utilizing the transmit circuitry 500) the harmonics generated by the receiver 208 and interpret the harmonics received as indicative of information communicated. In particular, by utilizing some active circuitry, when and how the harmonics are generated can be actively controlled by the receiver 208, so almost any information can be indicated by such harmonics. For example, in some aspects, the simple presence or not of harmonics can be indicative of a single bit of information (e.g., the receiver 208 has sufficient power or not, the receiver 208 is functioning normally or not, etc.). Further. In some aspects, the harmonics may be modified (e.g., modulated or varied) to indicate additional information (e.g., bits of information corresponding to different modulation or variance). For example, in some aspects the harmonics may be modified by adjusting a passive diode rectification path, or other modification to rectification through components (e.g., switches, resistors, etc.) in the rectification path. For example, switching (e.g., by selectively opening and closing a switch) series resistance, load, topology changes, re-tuning of the resonator, etc. may all be performed to modify the harmonics created. In some aspects, the harmonics may be modified by modulating the harmonics by switching (e.g., by selectively opening and closing a switch) one or more switches of the active rectifier of the receiver 208. The harmonics may be modulated based on the power level of DC current produced by the active rectifier to signal to the transmitter 204 the power level at the receiver 208. The techniques described herein, in some aspects, may utilize low power consumption techniques to selectively generate and/or modify the harmonics, so as to communicate information between the receiver 208 and the transmitter 204, while still being lower power than other active circuit techniques for communicating information.

In some aspects, the harmonics generated by the receiver 208 may be even harmonics (e.g., $2^{nd}$ order, $4^{th}$ order, etc.) as opposed to odd harmonics to avoid a low signal to noise ratio at the transmitter 204 for receiving the harmonics from the receiver 208, as the transmitter 204 may also generate odd harmonics when generating the wireless field 205. Accordingly, in certain aspects, the receiver 208 may utilize non-linear components (e.g., a capacitor with capacitance as a function of voltage, such as a reverse biased diode junction (e.g., diode or FET)) to generate such even harmonics.

Figure 7:
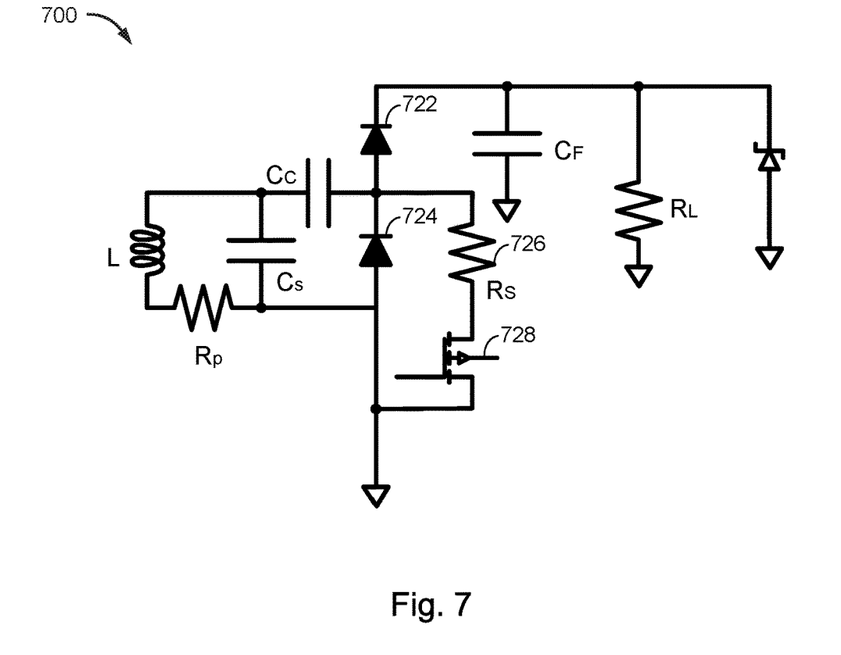
FIG. 7 is a schematic diagram of a portion of receive circuitry configured to selectively generate harmonics according to certain aspects of this disclosure.

FIG. 7 is a schematic diagram of a portion of receive circuitry 700 configured to selectively generate harmonics according to certain aspects of this disclosure. The receive circuitry 700 may correspond to a portion of the receiver 208. In particular, the receive circuitry 700 may have mostly the same components as the receive circuitry 400 of FIG. 4, as shown. However, the receive circuitry 700 may further include a switch (e.g., transistor) 728 configured to selectively couple (by selectively opening and closing the switch 728) the resistor 726 in parallel with the second diode 724. Accordingly, the receive circuitry 700 may be configured to selectively generate harmonics (e.g., second and third harmonics) based on whether or not the resistor 726 is coupled in parallel with the second diode 724 or not. For example, in some aspects, harmonics may be generated when the resistor 726 is coupled in parallel with the second diode 724, and harmonics may not be generated when the resistor 726 is not coupled in parallel with the second diode 724. The switch 728 may be controlled by a controller, such as the controller 250.

Figure 8:
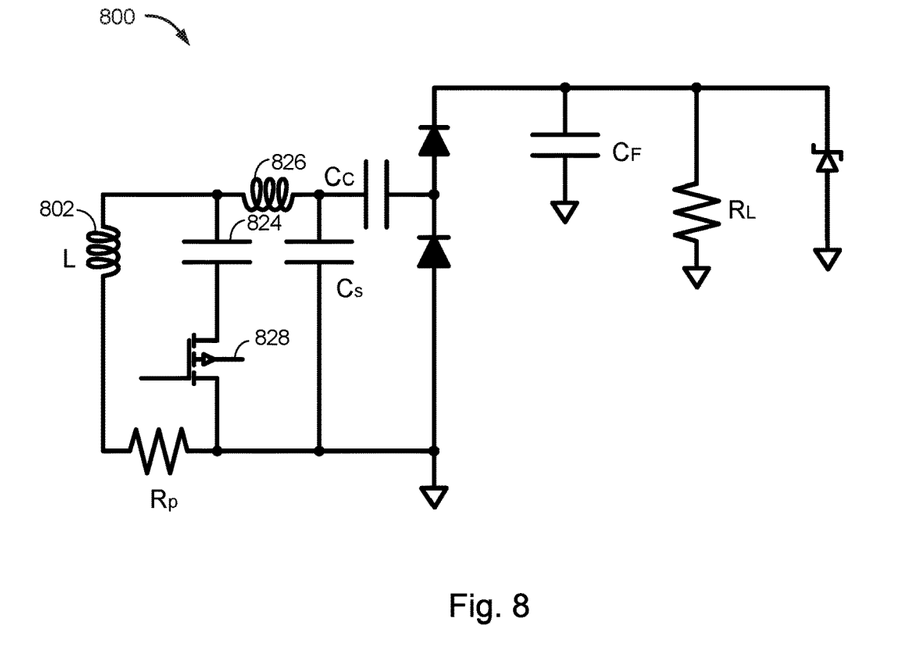
FIG. 8 is a schematic diagram of a portion of receive circuitry configured to selectively generate harmonics according to certain aspects of this disclosure.

FIG. 8 is a schematic diagram of another portion of receive circuitry 800 configured to selectively generate harmonics according to certain aspects of this disclosure. The receive circuitry 800 may correspond to a portion of the receiver 208. In particular, the receive circuitry 800 may have mostly the same components as the receive circuitry 400 of FIG. 4, as shown. However, the receive circuitry 800 may not include the resistor 426 of receive circuitry 400. Further, the receive circuitry 800 may additionally include a capacitor 824 selectively coupled in parallel with the receive antenna 802. In particular, a switch (e.g., transistor) 828 may be coupled in series with the capacitor 824 and configured to selectively couple (by selectively opening and closing the switch 828) the capacitor 824 in parallel with the receive antenna 802. Further, the receive circuitry 800 may additionally include an inductor 826 coupled in series with the antenna 802, wherein a coupling point of the capacitor 824 is between the receive antenna 802 and the inductor 826. The capacitor 824 and inductor 826 may be configured to act electromagnetic interference (EMI) filters that may block or pass harmonics from the receive circuitry 800. In particular, selectively coupling or decoupling the capacitor 824 in parallel with the antenna 802 may disconnect or modify the effect as an EMI filter, and therefore block or pass harmonics. For example, if the capacitor 824 is coupled in parallel with the antenna 802, the inductor 826 and capacitor 824 may block harmonics from being generated. However, if the capacitor 824 is not coupled in parallel with the antenna 802, the receive circuitry 800 may generate harmonics. The switch 828 may be controlled by a controller, such as the controller 250.

Figure 9:
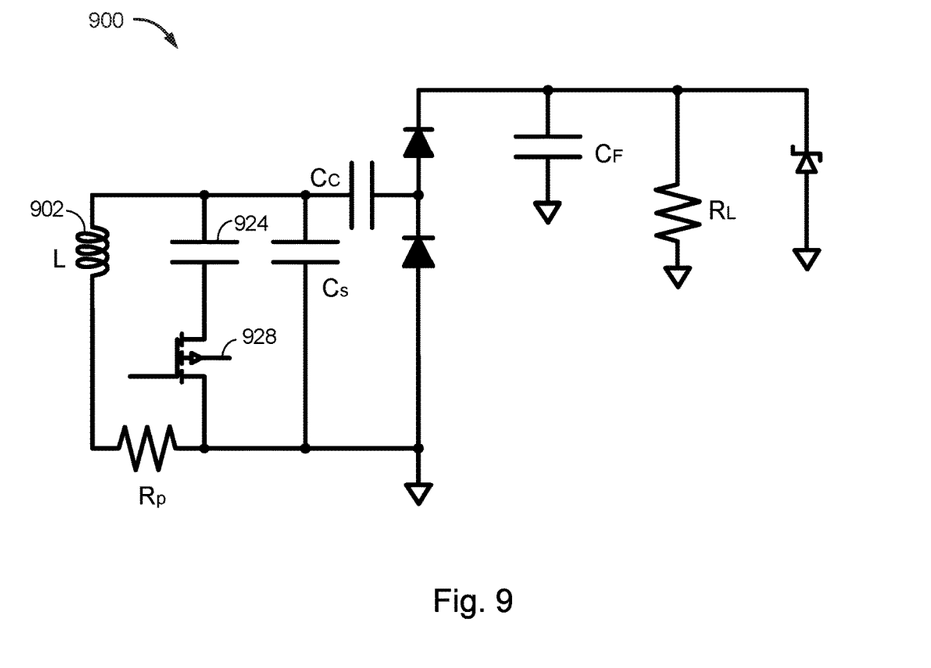
FIG. 9 is a schematic diagram of a portion of receive circuitry configured to selectively generate harmonics according to certain aspects of this disclosure.

FIG. 9 is a schematic diagram of another portion of receive circuitry 900 configured to selectively generate harmonics according to certain aspects of this disclosure. The receive circuitry 900 may correspond to a portion of the receiver 208. In particular, the receive circuitry 900 may have mostly the same components as the receive circuitry 400 of FIG. 4, as shown. However, the receive circuitry 900 may not include the resistor 426 of receive circuitry 400. Further, the receive circuitry 900 may additionally include a capacitor 924 coupled in parallel with the receive antenna 902. In some aspects, a switch (e.g., transistor) 928 may be coupled in series with the capacitor 924 and configured to selectively couple (by selectively opening and closing the switch 928) the capacitor 924 in parallel with the receive antenna 902. The capacitor 924 may have a nonlinear capacitance (e.g., the capacitor 924 may be one of a transcap variable capacitor, varactor/diode, FET, etc.). Accordingly, if the capacitor 924 is coupled in parallel with the antenna 902, the receive circuitry 900 may generate even harmonics. However, if the capacitor 924 is not coupled in parallel with the antenna 902, the receive circuitry 900 may not generate harmonics. The switch 928 may be controlled by a controller, such as the controller 250. In another aspect, instead of the receive circuitry 900 including a switch 928, the capacitance of the capacitor 924 may be adjusted (e.g., the capacitor 924 may comprise a variable capacitor) to selectively generate harmonics. The capacitance of the capacitor 924 may be controlled by a controller, such as the controller 250.

Figure 10:
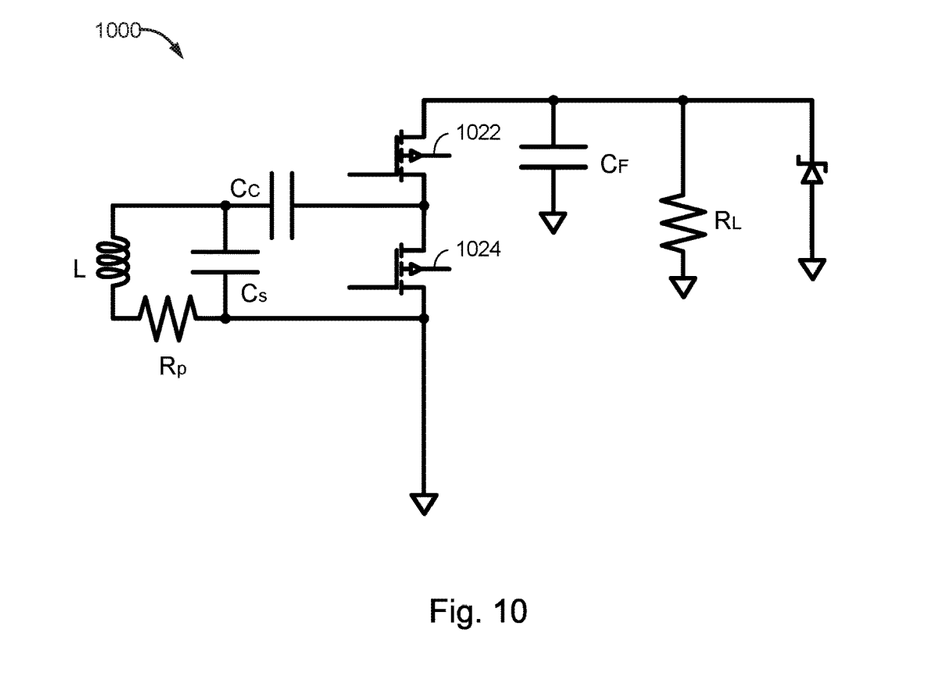
FIG. 10 is a schematic diagram of a portion of receive circuitry configured to selectively generate harmonics according to certain aspects of this disclosure.

FIG. 10 is a schematic diagram of another portion of receive circuitry 1000 configured to selectively generate harmonics according to certain aspects of this disclosure. The receive circuitry 1000 may correspond to a portion of the receiver 208. In particular, the receive circuitry 1000 may have mostly the same components as the receive circuitry 400 of FIG. 4, as shown. However, the receive circuitry 1000 may not include the resistor 426 of receive circuitry 400. Further, the receive circuitry 1000 may not include the first diode 422 and second diode 424, which form a passive rectifier, but instead include an active rectifier, such as shown using transistors 1022 and 1024. In some aspects, the switch timing (opening and closing) of the transistors 1022 and 1024 can be modified to modulate harmonics, while still rectifying most of the received power from the transmitter 204. In some other aspects, the transistors 1022 and 1024 may be selectively enabled and disabled to selectively enable and disable rectification. When rectification is enabled, harmonics may be generated. When rectification is disabled, harmonics may not be generated. The transistors 1022 and 1024 may be controlled by a controller, such as the controller 250.

A transmitter 204 may be configured to receive such harmonics generated by any of the circuitry 700-1000 and perform an action (e.g., adjust a strength of the wireless field 205) based on the received harmonics. For example, as discussed above the controller 250 of the receiver 208 may be configured to selectively generate the harmonics to communicate to the transmitter 204 information that the transmitter 204 may utilize to perform an action.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A wireless power receiver comprising:
an antenna;
a rectifier comprising a first diode and a second diode; and
a resistor in parallel with the first diode, wherein a first terminal of the resistor is coupled to a first terminal of the first diode, and wherein a second terminal of the resistor is coupled to a second terminal of the first diode.

2. The wireless power receiver of claim 1, wherein the first diode is configured to generate second harmonics when the first diode is conducting and the second diode is not conducting, and wherein the first diode and second diode are configured to generate third harmonics when the first diode and the second diode are conducting.

3. The wireless power receiver of claim 2, wherein generation of the second harmonics is indicative of a first level of power received via the antenna, and wherein generation of the third harmonics is indicative of a second level of power received via the antenna, wherein the second level of power is greater than the first level of power.

4. The wireless power receiver of claim 1, wherein the wireless power receiver comprises a medical implant.

5. The wireless power receiver of claim 1, wherein the antenna is coupled in parallel with the first diode.

6. The wireless power receiver of claim 1, further comprising a switch coupled in series to the resistor, the switch being coupled between the second terminal of the resistor and the second terminal of the first diode.

7. The wireless power receiver of claim 6, wherein the rectifier is configured to selectively generate harmonics based on selective opening and closing of the switch.

8. The wireless power receiver of claim 1, wherein the antenna is configured to inductively couple power from a wireless field.

9. The wireless power receiver of claim 8, wherein the wireless field is configured to induce an alternating current signal in the antenna, and wherein the rectifier is configured to produce a direct current signal to apply to a load based on the alternating current signal.

10. The wireless power receiver of claim 9, wherein a level of power of the alternating current signal induced in the antenna is based on a position of the wireless power receiver in a body, wherein the wireless power receiver comprises an implant.

11. The wireless power receiver of claim 8, wherein the first diode is configured to generate second harmonics when the first diode is conducting and the second diode is not conducting, and wherein the first diode and second diode are configured to generate third harmonics when the first diode and the second diode are conducting, and wherein a power level of the wireless field is based on the generation of the second harmonics and the third harmonics.

12. The wireless power receiver of claim 1, wherein the antenna comprises a coil electrically coupled to a capacitor.

* * * * *